No. 615,091. Patented Nov. 29, 1898.
N. McAULAY.
HORSE DETACHER.
(Application filed Dec. 14, 1897.)
(No Model.)
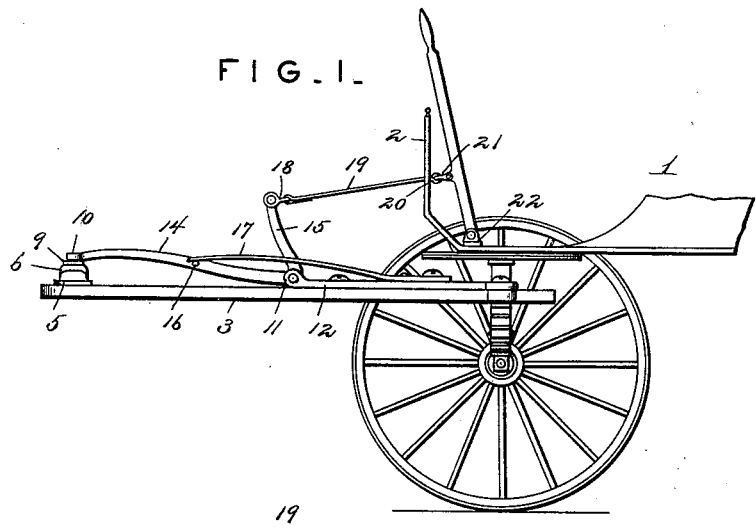
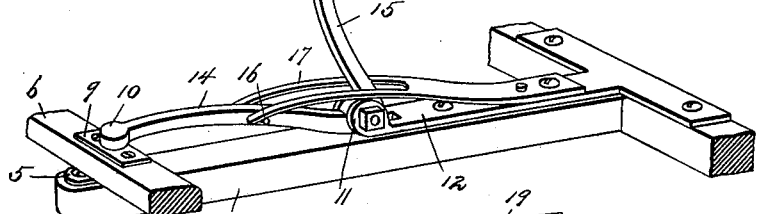
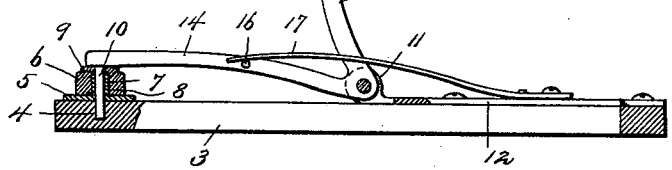
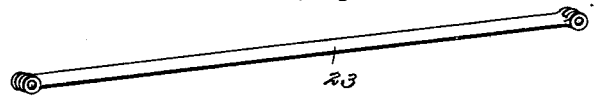
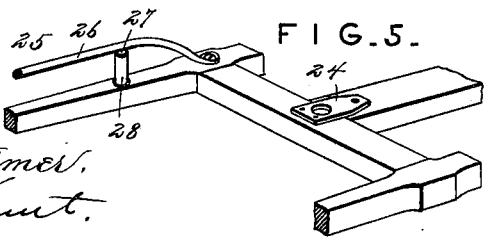
Witnesses
Harry L. Ames
C. C. Hunt
Inventor
Norman McAulay
by V. S. Stockbridge
his Attorney
THE NORRIS PETERS CO., PHOTO-LITHO., WASHINGTON, D. C.

UNITED STATES PATENT OFFICE.

NORMAN McAULAY, OF HILL CITY, SOUTH DAKOTA.

HORSE-DETACHER.

SPECIFICATION forming part of Letters Patent No. 615,091, dated November 29, 1898.

Application filed December 14, 1897. Serial No. 661,825. (No model.)

*To all whom it may concern:*

Be it known that I, NORMAN MCAULAY, a citizen of the United States, residing at Hill City, in the county of Pennington and State of South Dakota, have invented certain new and useful Improvements in Horse-Detachers; and I do hereby declare the following to be a full, clear, and exact description of the invention, such as will enable others skilled in the art to which it appertains to make and use the same.

This invention relates to a novel horse-detacher, and has for its object the production of a simple, durable, and efficient device by means of which the draft-animal may be instantly released from the vehicle by the driver when the animal becomes unruly and life is endangered.

To the accomplishment of this object the invention consists in certain novel details of construction and in the arrangement of parts hereinafter described, and succinctly pointed out in the appended claims.

Referring to the drawings, Figure 1 is a general view showing my device applied as in use. Fig. 2 is a detail perspective view, on a somewhat enlarged scale, of the horse-detacher and such portions of the supporting parts as are necessary to show the arrangement of the device. Fig. 3 is a side elevation, partly in section, of the subject-matter of Fig. 2. Fig. 4 is a detail view of the connecting-bar designed to be used in lieu of the flexible band intermediate of the releasing-lever and the bolt-lever, and Fig. 5 is a detail perspective view of a portion of the thills arranged to receive my device when it is designed to be attached to a one-horse vehicle.

Referring to the numerals on the drawings, 1 indicates a vehicle, 2 the dashboard thereof, and 3 the pole.

4 indicates a vertical aperture formed in the pole a short distance in advance of its rear end and protected by an apertured plate 5, designed to constitute a smooth rest for the doubletree 6, provided with a vertical bolt-aperture 7, in which is located a thimble 8, carried by a thimble-plate 9, secured upon the upper face of the doubletree.

10 indicates a strap-bolt extending through the thimble and into the pole and designed to pivotally connect the pole and doubletree in the usual manner. The bolt is rigid on and pendent from the forward end of the horizontal arm of what may be termed a "bolt-lever," which is of bell-crank form and is fulcrumed between a pair of circular ears 11, formed at the forward extremity of a fulcrum-plate 12, preferably of T form, as illustrated. The bolt-lever 10 is composed, as shown, of horizontal and vertical branches or arms 14 and 15, the former being provided at a suitable distance from the fulcrum with laterally-extending lugs or pins 16, upon which rest the forward extremities of a bifurcated spring 17, screwed or otherwise secured upon the upper face of the fulcrum-plate in the rear of the fulcrum, the bifurcation of the spring accommodating the lever and permitting the arms of the spring to stride the upright arm of the bolt-lever and to overlie the pins 16 for holding the arm 14 normally down, with the bolt or pin 10 connecting the whiffletree with the pole.

18 indicates a swiveled loop at the upper end of the vertical arm of the lever, to which is connected a flexible connecting-piece 19, provided at its opposite extremity with an elongated loop 20, designed to be detachably connected to a swiveled loop 21, carried by what may be termed the "releasing-lever," fulcrumed at its lower end upon a suitable plate 22, secured to the vehicle-body, preferably immediately in front of the dashboard. It is obvious, however, that the location of the releasing-lever is not essential in that it may be placed at any point to facilitate its instant use in the event of an emergency. It will now be seen that when the draft-animals are harnessed to the doubletree in the ordinary manner they may be instantly detached by a pull upon the releasing-lever, which will cause the bolt-lever to be swung inwardly against the resistance of the spring and will elevate the bolt connecting the doubletree to the tongue, and the former will be removed by the draft-animals. It is obvious that instead of the flexible connecting-piece a connecting-rod 23 may be pivoted at its opposite ends to the bolt and releasing levers.

In Fig. 5 of the drawings I have illustrated a portion of the thills merely for the purpose of showing the rearwardly-extending bracket 24, secured to the center of the cross-bar of the thills and designed to support the detaching mechanism, which is secured to the bolt connecting the singletree to the cross-bar.

In this figure I have illustrated a holdback 25 of novel form, consisting of a longitudinally-extending rod 26, having its rear end bent downwardly and connected to the thill and provided with a depending standard 27, which passes downward to the thill and is provided with a nut screwed upon its lower extremity, a suitable sleeve 28 being mounted upon the standard intermediate of the thill and bar for an obvious purpose.

It will be seen that I have produced a simple and efficient device by means of which the draft-animal may be instantly detached from the vehicle to prevent injury to the occupants by collision or by the overturning of the vehicle when the draft-animals become uncontrollable; but while the present embodiment of the invention appears at this time to be preferable I do not desire to limit myself to the structural details set out, but reserve the right to change, modify, or vary them at will within the scope of the protection prayed.

Having thus described my invention, what I claim as new, and desire to secure by Letters Patent, is—

1. In a horse-detaching device, the combination with the whiffletree-securing bolt, of the bell-crank lever connected to said bolt, a bifurcated spring striding the upright arm of said lever and operatively connected with the horizontal arm thereof for holding the bolt normally in operative position, substantially as described.

2. In a horse-detaching device, the combination with the whiffletree-securing bolt, of a bell-crank bolt-lever rigidly connected to said bolt, a bifurcated spring, striding and operatively connected with said bolt-lever for holding the bolt normally in operative position, and a releasing-lever on the vehicle operatively connected with said bolt-lever for actuating it to overcome the tension of the spring and release the whiffletree, substantially as described.

In testimony whereof I affix my signature in presence of two witnesses.

NORMAN McAULAY.

Witnesses:
F. H. SCHWEEN,
H. T. SCHNEE.